(12) United States Patent
Kuan (10) Patent No.: US 8,669,962 B2
(45) Date of Patent: Mar. 11, 2014

(54) PORTABLE ELECTRONIC DEVICE AND METHOD FOR AVOIDING ERRONEOUS TOUCH ON TOUCH PANEL THEREOF

(75) Inventor: Tsung-Pao Kuan, Taoyuan County (TW)

(73) Assignee: HTC Corporation, Taoyuan, Taoyuan County (TW)

( * ) Notice: Subject to any disclaimer, the term of this patent is extended or adjusted under 35 U.S.C. 154(b) by 626 days.

(21) Appl. No.: 12/626,626

(22) Filed: Nov. 26, 2009

(65) Prior Publication Data

US 2010/0214258 A1  Aug. 26, 2010

(30) Foreign Application Priority Data

Feb. 26, 2009  (TW) .............................. 98106141 A (51) Int. Cl.
*G06F 3/045* (2006.01)
(52) U.S. Cl.
USPC .......................................... 345/174; 345/173
(58) Field of Classification Search
None
See application file for complete search history.

(56) References Cited

U.S. PATENT DOCUMENTS

| 7,847,789 B2 * | 12/2010 | Kolmykov-Zotov et al. . 345/173 |
| 2005/0110769 A1 | 5/2005 | DaCosta |
| 2006/0109252 A1 | 5/2006 | Kolmykov-Zotov |
| 2007/0049358 A1 * | 3/2007 | Kang et al. ................. 455/575.1 |
| 2009/0009482 A1 * | 1/2009 | McDermid .................... 345/173 |
| 2011/0115742 A1 * | 5/2011 | Sobel et al. ................... 345/174 |

FOREIGN PATENT DOCUMENTS

| TW | 200802065 | 1/2008 |
| TW | 200823721 | 6/2008 |
| TW | 200838266 | 9/2008 |

OTHER PUBLICATIONS

Office action mailed on May 25, 2011 for the China application No. 200910126909.0, filing date Mar. 5, 2009, p. 1-6.
Office action mailed on Sep. 25, 2012 for the Taiwan application No. 098106141, filed Feb. 26, 2009, p. 1-12.

* cited by examiner

*Primary Examiner* — Jason Olson
(74) *Attorney, Agent, or Firm* — Winston Hsu; Scott Margo (57) ABSTRACT

A method for avoiding an erroneous touch on a touch panel in a portable electronic device includes the steps of: determining whether a triggering event is received; enabling a sensor when the triggering event is received; detecting a distance between the portable electronic device and an object by the sensor; and determining a predetermined touch pressure threshold of the touch panel according to the detected distance.

18 Claims, 5 Drawing Sheets

PORTABLE ELECTRONIC DEVICE AND METHOD FOR AVOIDING ERRONEOUS TOUCH ON TOUCH PANEL THEREOF

BACKGROUND OF THE INVENTION

1. Field of the Invention

The present invention relates to a portable electronic device and a related method for avoiding erroneous touches on its touch panel, and more particularly, to a portable electronic device and a related method for adjusting a predetermined touch pressure threshold of the touch panel by detecting a distance between the portable electronic device and an object.

2. Description of the Prior Art

Since portable electronic products, such as PDAs, mobile phones, and PDA phones have become more and more prevalent in consumer electronics market, touch panels have been broadly applied to these products as a data communication interface. As to the mobile phone, the users may erroneously touch the touch panel since their faces are too close to the touch panel when making or answering a phone call, which often persecutes the users. If the mobile phone is equipped with a capacity of determining when the users do want to perform the touch functions and when the users do not want to perform the touch functions, the problems of persecuting the users caused by erroneous touches can be reduced and thereby bring the users more convenience.

SUMMARY OF THE INVENTION

It is one of the objectives of the present disclosure to provide a portable electronic device and a related method for avoiding an erroneous touch on its touch panel to solve the abovementioned problems.

The present disclosure provides a method for avoiding an erroneous touch on a touch panel in a portable electronic device. The method includes the steps of determining whether a triggering event is received; enabling a sensor when the triggering event is received; detecting a distance between the portable electronic device and an object by the sensor; and determining the predetermined touch pressure threshold of the touch panel according to the detected distance between the portable electronic device and the object.

In one embodiment, the predetermined touch pressure threshold is adjusted to a first threshold when the detected distance between the portable electronic device and the object is not smaller than the predetermined distance; and the predetermined touch pressure threshold is adjusted to a second threshold when the detected distance between the portable electronic device and the object is smaller than the predetermined distance.

In another embodiment, the portable electronic device is enabled to operate in a first mode and the predetermined touch pressure threshold is not adjusted when the detected distance between the portable electronic device and the object is not smaller than the predetermined distance; and the portable electronic device is enabled to operate in a second mode and the predetermined touch pressure threshold is adjusted to a second threshold when the detected distance between the portable electronic device and the object is smaller than the predetermined distance.

The present disclosure provides a portable electronic device. The portable electronic device comprises a touch panel, a sensor, a triggering event determining module, and a touch pressure threshold setting module. The touch panel has a predetermined touch pressure threshold. The sensor detects a distance between the portable electronic device and an object. The triggering event determining module determines whether a triggering event is received, and enables the sensor when the triggering event is received. The touch pressure threshold setting module determines the predetermined touch pressure threshold of the touch panel according to the distance detected by the sensor.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
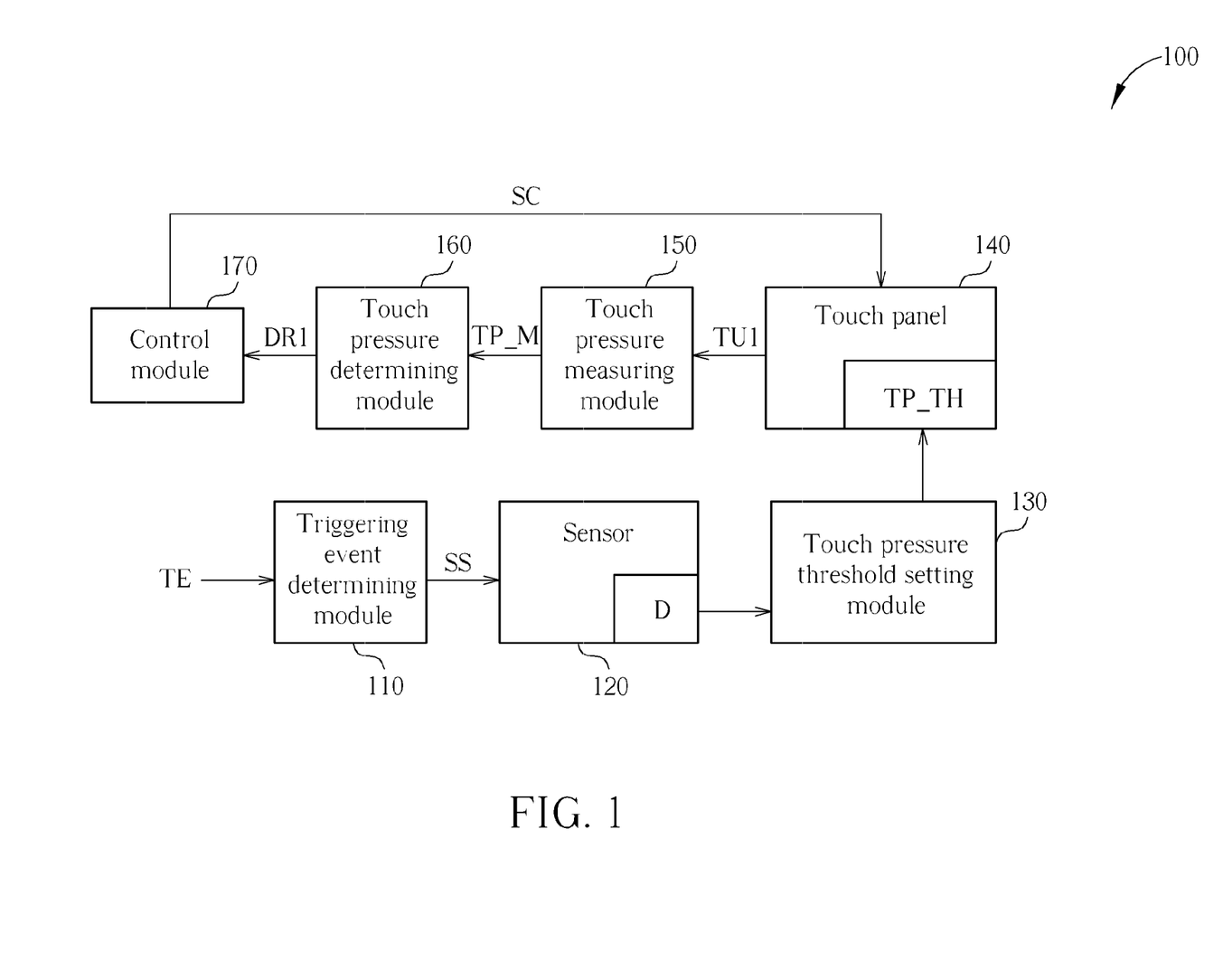
FIG. 1 is a diagram of a portable electronic device according to an embodiment of the present invention.

Please refer to FIG. 1. FIG. 1 is a diagram of a portable electronic device 100 according to an embodiment of the present invention. As shown in FIG. 1, the portable electronic device 100 includes, but is not limited to, a triggering event determining module 110, a sensor 120, a touch pressure threshold setting module 130, a touch panel 140, a touch pressure measuring module 150, a touch pressure determining module 160, and a control module 170. The touch panel 140 has a predetermined touch pressure threshold TP_TH. The triggering event determining module 110 is configured to determine whether a triggering event TE is received and transmit a start signal SS to enable the sensor 120 when the triggering event TE is received. The sensor 120 is configured to detect a distance D between the portable electronic device 100 and an object, here the so-called object can be face, ear or any object approaching the portable electronic device 100. In this embodiment, the sensor 120 can be any sensor capable of detecting the distance between the portable electronic device 100 and an object or detecting whether the portable electronic device 100 approaches an object, e.g. a proximity sensor or an ultrasonic distance sensor. The touch pressure threshold setting module 130 is configured to determine the predetermined touch pressure threshold TP_TH of the touch panel 140 according to the distance D between the portable electronic device 100 and the object detected by the sensor 120.

Please keep referring to FIG. 1. The touch pressure measuring module 150 is configured to measure a touch pressure value TP_M corresponding to a touch TU1. The touch pressure determining module 160 is configured to determine whether the touch pressure value TP_M is greater than the predetermined touch pressure threshold TP_TH to generate a determination result DR1. The control module 170 is configured to determine whether to perform a touch function corresponding to the touch TU1 according to the determination result DR1.

Please note that the portable electronic device 100 can be a mobile phone or a PDA. But this should not be considered as limitations of the present invention, the portable electronic device 100 can be a mobile device of other types. Furthermore, the triggering event TE can comprise a phone call or a wake-up notice, but the present invention is not limited to this only and can be other triggering events.

Please also note that, in order to solve the abovementioned problems of persecuting the users caused by erroneous touches on the touch panel in the prior art, the mechanism and the method disclosed in the present invention determines the predetermined touch pressure threshold TP_TH of the touch panel 140 based on the distance D, which is detected by the sensor 120, between the portable electronic device 100 and the object. For example, the sensor 120 can be utilized for determining whether the distance D between the portable electronic device 100 and the object is smaller than a predetermined distance D1. When the distance D between the portable electronic device 100 and the object is not smaller than the predetermined distance D1, it is judged that the user did not put the portable electronic device 100 near the ear and the portable electronic device 100 is enabled to operate in a first mode (i.e., a normal mode). When the distance D between the portable electronic device 100 and the object is smaller than the predetermined distance D1, it is judged that the user did put the portable electronic device 100 near the ear (under a condition prone to erroneous touches) and the portable electronic device 100 is enabled to operate in a second mode different from the first mode.

In the following, several examples are taken for illustration. In a first example, the predetermined touch pressure threshold TP_TH of the touch panel 140 is adjusted to a first threshold TH1 in the first mode, and the predetermined touch pressure threshold TP_TH of the touch panel 140 is adjusted to a second threshold TH2 in the second mode, wherein the second threshold TH2 is greater than the first threshold TH1. Since the predetermined touch pressure threshold TP_TH of the touch panel 140 is increased in the second mode (i.e., TH2>TH1), the control module 170 will perform the touch function corresponding to the touch TU1 only when the measured touch pressure value TP_M in the second mode is greater than the second threshold TH2. Accordingly, the condition of erroneously touching the touch panel can be avoided.

In a second example, the predetermined touch pressure threshold TP_TH of the touch panel 140 is not adjusted in the first mode, and the predetermined touch pressure threshold TP_TH of the touch panel 140 is adjusted to a threshold TH3 in the second mode. Hence, it is not necessary to measure the touch pressure value TP_M in the first mode. The control module 170 will perform the touch function corresponding to the touch TU1 only when the measured touch pressure value TP_M in the second mode is greater than the threshold TH3. Accordingly, the condition of erroneously touching the touch panel can be avoided.

Figure 2:
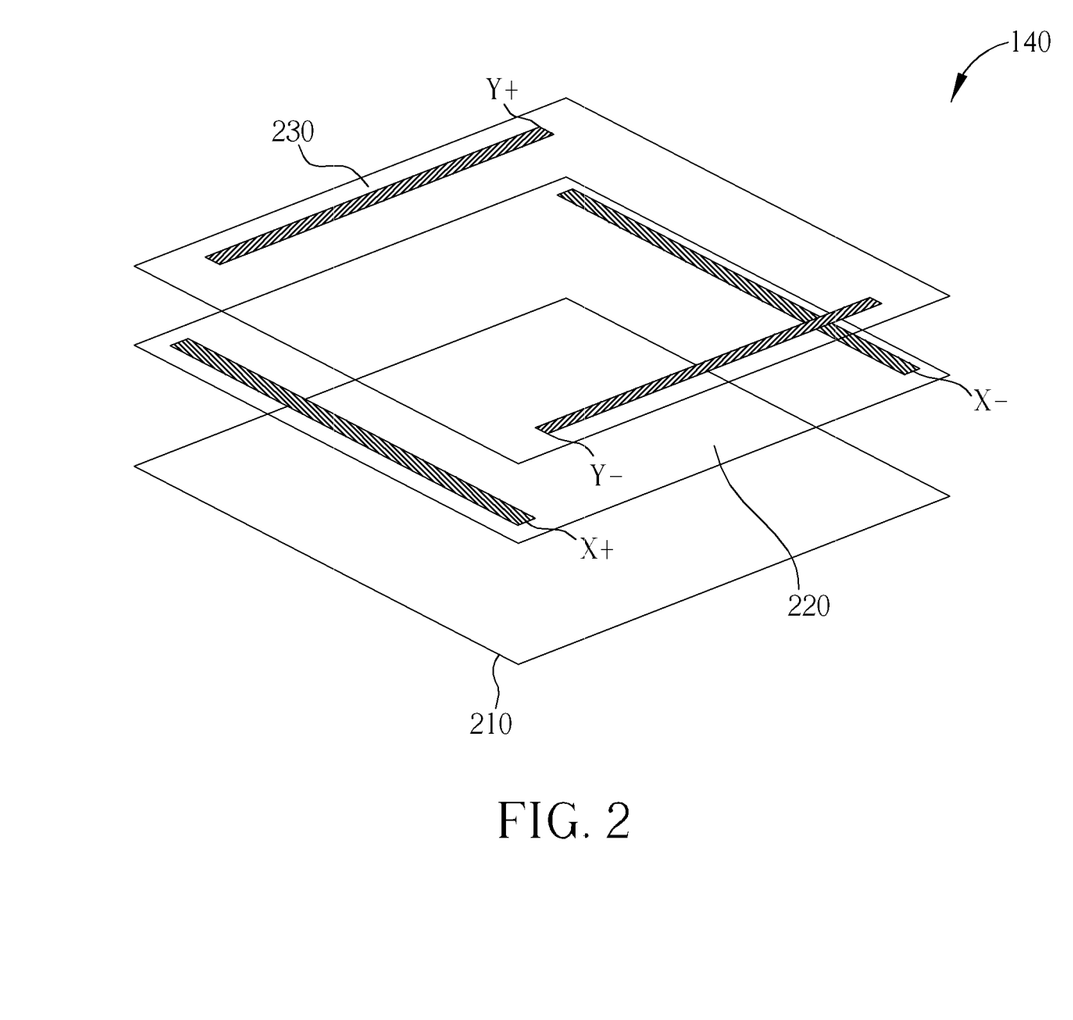
FIG. 2 is a diagram showing an example of the touch panel shown in FIG. 1.

Please note that the touch panel 140 can be a resistive touch panel. Please refer to FIG. 2. FIG. 2 is a diagram showing an example of the touch panel 140 shown in FIG. 1. As shown in FIG. 2, the touch panel 140 comprises a display 210, a first resistive plate 220, and a second resistive plate 230. The first resistive plate 220 and the second resistive plate 230 form a resistive touch screen. The display 210 can be an LCD display, but this should not be considered as limitations of the present invention. The first resistive plate 220 is parallel to the display 210 and the second resistive plate 230 is parallel to the first resistive plate 220, wherein the second resistive plate 230 as well as the first resistive plate 220 is disposed on the same side of the display 210. Each of the first resistive plate 220 and the second resistive plate 230 is a flexible transparent resistive layer. The first resistive plate 220 has conductive electrodes X+ and X− on the left and right edges thereof. The second resistive plate 230 has conductive electrodes Y+ and Y− on the upper and lower edges. If the first resistive plate 220 and the second resistive plate 230 have a consistent resistivity, the voltage at any point between the two electrodes should be proportional to the horizontal position of the first resistive plate 220 and the vertical position of the second resistive plate 230. When the touch TU1 occurs on the display 210, it will cause the first resistive plate 220 and the second resistive plate 230 in contact with each other. By measuring the voltage caused by the touch TU1 and formed between the first resistive plate 220 and the second resistive plate 230, the position (including the X position and the Y position) of the touch TU1 can be determined. Moreover, a contact resistance $R_T$ caused by the touch TU1 and formed between the first resistive plate 220 and the second resistive plate 230 can be measured to calculate the touch pressure value TP_M corresponding to the touch TU1.

Figure 3:
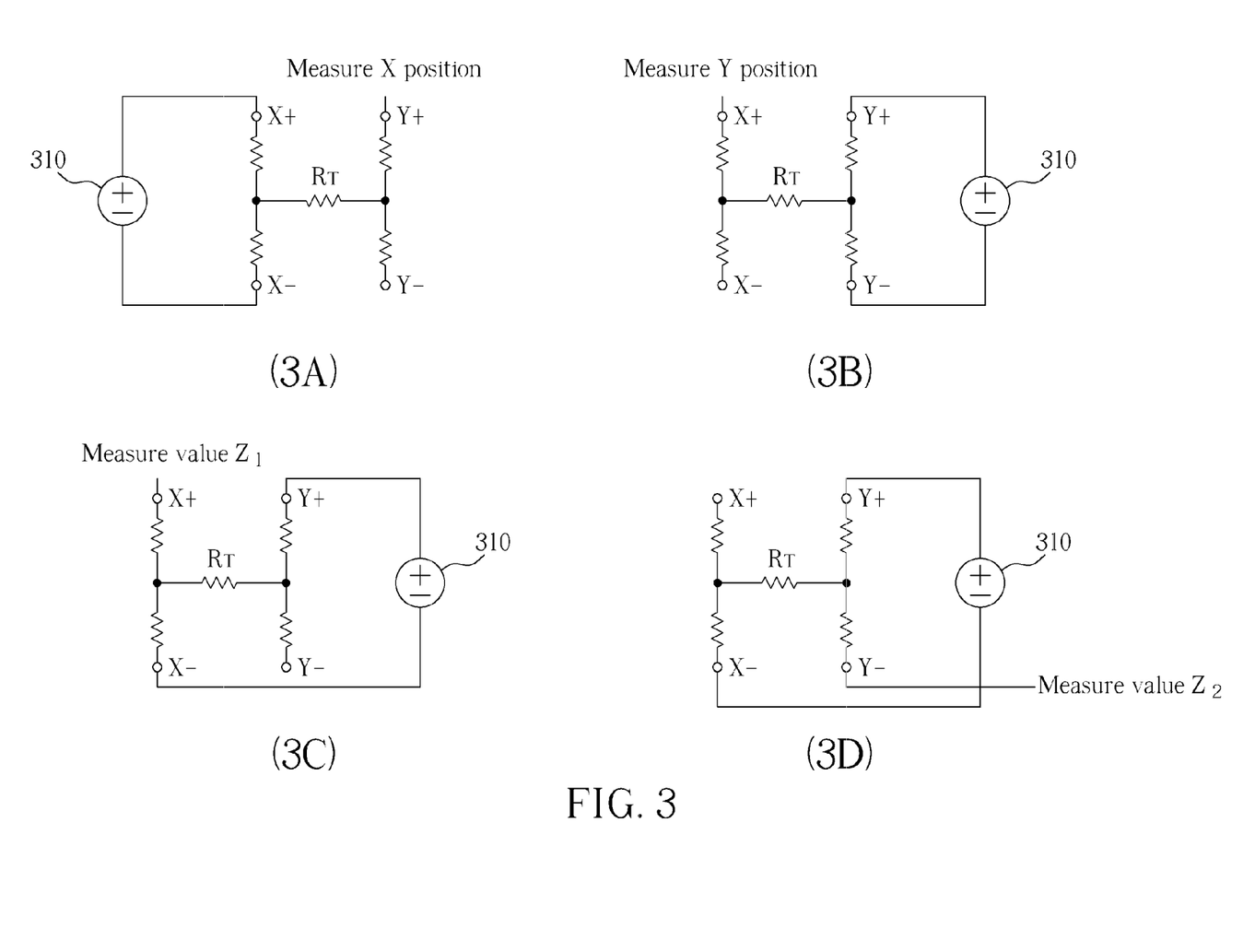
FIG. 3 (including 3A, 3B, 3C, and 3D) is an equivalent-circuit diagram illustrating how to measure a position and a contact resistance corresponding to a touch on a touch panel.

Please refer to FIG. 3 and FIG. 2. FIG. 3 (including 3A, 3B, 3C, and 3D) is an equivalent-circuit diagram illustrating how to measure a position and a contact resistance corresponding to the touch TU1 on the touch panel 140. In FIG. 3, X+ and X− respectively represents the electrodes X+ and X− of the first resistive plate 220 shown in FIG. 2, Y+ and Y− respectively represents the electrodes Y+ and Y− of the second resistive plate 230 shown in FIG. 2, and $R_T$ represents the contact resistance formed between the first resistive plate 220 and the second resistive plate 230. As shown in 3A, the two electrodes X+ and X− are connected to a power 310. At this time, the voltage of the electrode Y+ is measured to obtain the X position. As shown in 3B, the two electrodes Y+ and Y− are connected to the power 310. At this time, the voltage of the electrode X+ is measured to obtain the Y position. As shown in 3C, the two electrodes Y+ and X− are connected to the power 310. At this time, the voltage of the electrode X+ is measured to obtain a value Z1. As shown in 3D, the two electrodes Y+ and X− are connected to the power 310. At this time, the voltage of the electrode Y− is measured to obtain a value Z2. The X position represents the X coordinate of the touch TU1 on the resistive touch screen, the Y position represents the Y coordinate of the touch TU1 on the resistive touch screen, and the values $Z_1$ and $Z_2$ represent the touch pressure value TP_M of the touch TU1.

Figure 4:
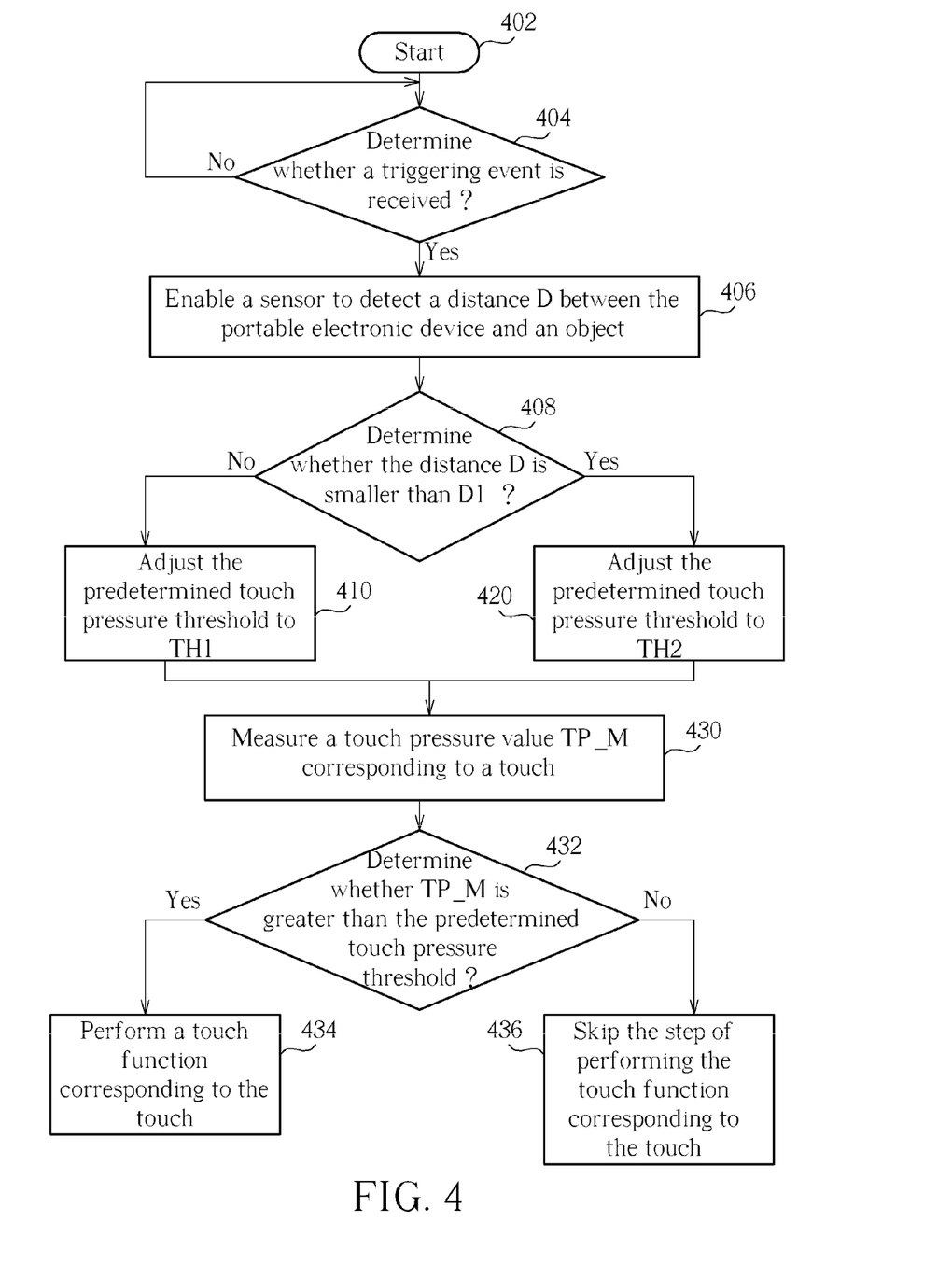
FIG. 4 is a flowchart illustrating a method for avoiding an erroneous touch on a touch panel in a portable electronic device according an exemplary embodiment of the present invention.

Please refer to FIG. 4. FIG. 4 is a flowchart illustrating a method for avoiding an erroneous touch on a touch panel in a portable electronic device according an exemplary embodiment of the present invention. Please note that the following steps are not limited to be performed according to the exact sequence shown in FIG. 4 if a roughly identical result can be obtained. The method includes the following steps:

Step 402: Start.

Step 404: Determine whether a triggering event is received. When the triggering event is received, go to Step 406; otherwise, repeat Step 404.

Step 406: Enable a sensor to detect a distance D between the portable electronic device and an object. Afterwards, go to Step 408.

Step 408: Determine whether the distance D between the portable electronic device and the object is smaller than a predetermined distance D1. When the distance D between the portable electronic device and the object is not smaller than the predetermined distance D1, go to Step 410; otherwise, go to Step 420.

Step 410: Enable the portable electronic device to operate in a first mode, and adjust the predetermined touch pressure threshold to a first threshold TH1. Afterwards, go to Step 430.

Step 420: Enable the portable electronic device to operate in a second mode, and adjust the predetermined touch pressure threshold to a second threshold TH2. Afterwards, go to Step 430.

Step 430: Measure a touch pressure value TP_M corresponding to a touch. Afterwards, go to Step 432.

Step 432: Determine whether the touch pressure value TP_M is greater than the predetermined touch pressure threshold. When the touch pressure value is greater than the predetermined touch pressure threshold, go to Step 434; otherwise, go to Step 436.

Step 434: Perform a touch function corresponding to the touch.

Step 436: Skip the step of performing the touch function corresponding to the touch.

The following description details how each element operates by collocating the steps shown in FIG. 4 and the elements shown in FIG. 1. In Step 404, the triggering event determining module 110 determines whether the triggering event TE, such as a phone call or a wake-up notice, is received. When the triggering event TE is received, it transmits the start signal SS to enable the sensor 120 (Step 406); and when the triggering event TE is not received, the triggering event determining module 110 continues determining whether the triggering event TE is received. After the sensor 120 is enabled, the sensor 120 determines whether the distance D between the portable electronic device 100 and the object is smaller than the predetermined distance D1 (Step 408), and then the touch pressure threshold setting module 130 adjusts the predetermined touch pressure threshold TP_TH of the touch panel 140 based on the distance D between the portable electronic device 100 and the object. When the distance D between the portable electronic device 100 and the object is not smaller than the predetermined distance D1, the touch pressure threshold setting module 130 adjusts the predetermined touch pressure threshold TP_TH to the first threshold TH1 (Step 410); and when the distance D between the portable electronic device 100 and the object is smaller than the predetermined distance D1, the touch pressure threshold setting module 130 adjusts the predetermined touch pressure threshold TP_TH to the second threshold TH2 (Step 420). After that, when the touch panel 140 receives the touch TU1, the touch pressure measuring module 150 measures the touch pressure value TP_M corresponding to the touch TU1 (Step 430) and the touch pressure determining module 160 then determines whether the touch pressure value TP_M is greater than the predetermined touch pressure threshold TP_TH (Step 432). When the touch pressure value TP_M is greater than the predetermined touch pressure threshold TP_TH, the control module 170 performs the touch function corresponding to the touch TU1 (Step 434); and when the touch pressure value TP_M is not greater than the predetermined touch pressure threshold TP_TH, the control module 170 skips the step of performing the touch function corresponding to the touch TU1 (Step 436). In this embodiment, the predetermined touch pressure threshold TP_TH is adjusted to the first threshold TH1 in the first mode, while it is adjusted to the second threshold TH2 in the second mode wherein TH2 is greater than TH1. As a result, the control module 170 performs the touch function corresponding to the touch TU1 when the touch pressure value TP_M is greater than the first threshold TH1 in the first mode. In the second mode, the control module 170 performs the touch function corresponding to the touch TU1 only when the touch pressure value TP_M is greater than the second threshold TH2. Therefore, the condition of erroneously touching the touch panel can be avoided.

Figure 5:
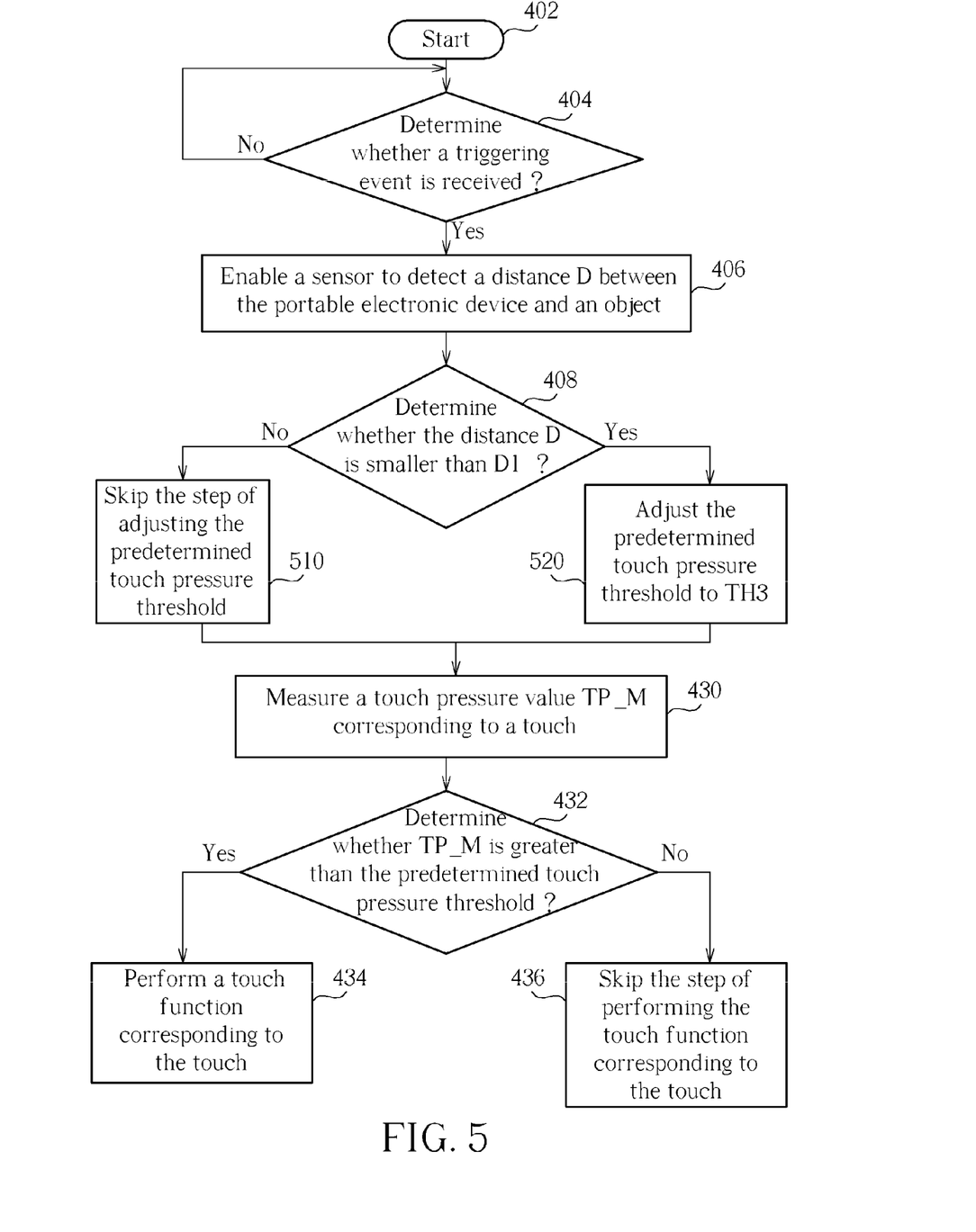
FIG. 5 is a flowchart illustrating a method for avoiding an erroneous touch on a touch panel in a portable electronic device according another exemplary embodiment of the present invention.

Please refer to FIG. 5. FIG. 5 is a flowchart illustrating a method for avoiding an erroneous touch on a touch panel in a portable electronic device according another exemplary embodiment of the present invention. The method includes, but is not limited to, the following steps:

Step 402: Start.

Step 404: Determine whether a triggering event is received. When the triggering event is received, go to Step 406; otherwise, repeat Step 404.

Step 406: Enable a sensor to detect a distance D between the portable electronic device and an object. Afterwards, go to Step 408.

Step 408: Determine whether the distance D between the portable electronic device and the object is smaller than a predetermined distance D1. When the distance D between the portable electronic device and the object is not smaller than the predetermined distance D1, go to Step 510; otherwise, go to Step 520.

Step 510: Enable the portable electronic device to operate in a first mode, and skip the step of adjusting the predetermined touch pressure threshold. Afterwards, go to Step 430.

Step 520: Enable the portable electronic device to operate in a second mode, and adjust the predetermined touch pressure threshold to a threshold TH3. Afterwards, go to Step 430.

Step 430: Measure a touch pressure value corresponding to a touch. Afterwards, go to Step 432.

Step 432: Determine whether the touch pressure value TP_M is greater than the predetermined touch pressure threshold. When the touch pressure value TP_M is greater than the predetermined touch pressure threshold, go to Step 434; otherwise, go to Step 436.

Step 434: Perform a touch function corresponding to the touch.

Step 436: Skip the step of performing the touch function corresponding to the touch.

Please note that the steps in FIG. 5 are similar to the steps in FIG. 4, and the difference between them is that the steps 410 and 420 shown in FIG. 4 are replaced by the steps 510 and 520 shown in FIG. 5. In other words, the predetermined touch pressure threshold TP_TH is adjusted to the first threshold TH1 in the first mode while it is adjusted to the second threshold TH2 in the second mode in FIG. 4, wherein the second threshold TH2 is greater than the first threshold TH1. On the other hand, the predetermined touch pressure threshold TP_TH is not adjusted in the first mode while it is adjusted to the threshold TH3 in the second mode in FIG. 5. Although the approaches of these two embodiments are different from each other, both of them can achieve the goal of avoiding an erroneous touch on the touch panel.

Please note that, the steps of the abovementioned flowcharts are merely a practicable embodiment of the present invention, and in no way should be considered to be limitations of the scope of the present invention. The method can include other intermediate steps or can merge several steps into a single step without departing from the spirit of the present invention. Those skilled in the art should observe that various modifications of these methods may be made.

The abovementioned embodiments are presented merely for describing the present invention, and in no way should be considered to be limitations of the scope of the present invention. In summary, the present invention provides a portable electronic device and a related method for avoiding an erroneous touch on its touch panel. By enabling a sensor to detect the distance between the portable electronic device and an object together with by adjusting the predetermined touch pressure threshold of the portable electronic device based on the detected distance, the portable electronic device can have different predetermined touch pressure thresholds under different conditions. Therefore, since the predetermined touch pressure threshold is increased when the user answers an incoming call, the condition that erroneous touches happened resulted from the face approaching to the portable electronic device can be reduced. Under a normal condition, the predetermined touch pressure threshold is maintained at its default value or is not adjusted, so as to perform the touch function of the touch panel properly. Accordingly, by adopting the portable electronic device and the method disclosed in the present invention, the problem of persecuting users caused by erroneous touches can be reduced and thereby give the users more convenience.

Those skilled in the art will readily observe that numerous modifications and alterations of the device and method may be made while retaining the teachings of the invention.

What is claimed is:

1. A method for avoiding an erroneous touch on a touch panel in a portable electronic device, the touch panel having a predetermined touch pressure threshold, the method comprising:
   determining whether a triggering event is received;
   when the triggering event is received, enabling a sensor, wherein the triggering event comprises a phone call;
   detecting a distance between the portable electronic device and an object by the sensor; and
   determining the predetermined touch pressure threshold of the touch panel according to the detected distance between the portable electronic device and the object.

2. The method of claim 1, wherein the step of determining the predetermined touch pressure threshold of the touch panel according to the detected distance between the portable electronic device and the object comprises:
   determining whether the detected distance between the portable electronic device and the object is smaller than a predetermined distance;
   when the detected distance between the portable electronic device and the object is not smaller than the predetermined distance, adjusting the predetermined touch pressure threshold to a first threshold; and
   when the detected distance between the portable electronic device and the object is smaller than the predetermined distance, adjusting the predetermined touch pressure threshold to a second threshold.

3. The method of claim 2, further comprising:
   measuring a touch pressure value corresponding to a touch on the touch panel, and determining whether the touch pressure value is greater than the predetermined touch pressure threshold to generate a determination result; and
   determining whether to perform a touch function corresponding to the touch according to the determination result.

4. The method of claim 3, wherein the step of determining whether to perform the touch function corresponding to the touch according to the determination result comprises:
   when the determination result indicates that the touch pressure value is greater than the predetermined touch pressure threshold, performing the touch function corresponding to the touch; and
   when the determination result indicates that the touch pressure value is not greater than the predetermined touch pressure threshold, skipping the step of performing the touch function corresponding to the touch.

5. The method of claim 3, wherein the touch panel is a resistive touch panel, and the step of measuring the touch pressure value corresponding to the touch on the touch panel comprises:
   measuring a contact resistance caused by the touch and formed between a first resistive plate and a second resistive plate of the resistive touch panel; and
   transforming the contact resistance into the touch pressure value.

6. The method of claim 1, wherein the step of determining the predetermined touch pressure threshold of the touch panel according to the detected distance between the portable electronic device and the object comprises:
   determining whether the detected distance between the portable electronic device and the object is smaller than a predetermined distance;
   when the detected distance between the portable electronic device and the object is not smaller than the predetermined distance, enabling the portable electronic device to operate in a first mode and skipping the step of adjusting the predetermined touch pressure threshold; and
   when the detected distance between the portable electronic device and the object is smaller than the predetermined distance, enabling the portable electronic device to operate in a second mode and adjusting the predetermined touch pressure threshold to a second threshold.

7. The method of claim 6, further comprising:
   when the portable electronic device operates in the second mode, measuring a touch pressure value corresponding to a touch on the touch panel and determining whether the touch pressure value is greater than the second threshold to generate a determination result; and
   determining whether to perform a touch function corresponding to the touch according to the determination result.

8. The method of claim 7, wherein the step of determining whether to perform the touch function corresponding to the touch according to the determination result comprises:
   when the determination result indicates that the touch pressure value is greater than the second threshold, performing the touch function corresponding to the touch; and
   when the determination result indicates that the touch pressure value is not greater than the second threshold, skipping the step of performing the touch function corresponding to the touch.

9. The method of claim 7, wherein the touch panel is a resistive touch panel, and the step of measuring the touch pressure value corresponding to the touch on the touch panel comprises:
   measuring a contact resistance caused by the touch and formed between a first resistive plate and a second resistive plate of the resistive touch panel; and
   transforming the contact resistance into the touch pressure value.

10. A portable electronic device, comprising:
   a touch panel, having a predetermined touch pressure threshold;
   a sensor, configured to detect a distance between the portable electronic device and an object;
   a triggering event determining module, configured to determine whether a triggering event is received and enable the sensor when the triggering event is received, wherein the triggering event comprises a phone call; and
   a touch pressure threshold setting module, configured to determine the predetermined touch pressure threshold of the touch panel according to the distance detected by the sensor.

11. The portable electronic device of claim 10, wherein:
the sensor is further configured to determine whether the detected distance between the portable electronic device and the object is smaller than a predetermined distance; and the touch pressure threshold setting module is further configured to perform steps of:

adjusting the predetermined touch pressure threshold to a first threshold when the detected distance between the portable electronic device and the object is not smaller than the predetermined distance; and adjusting the predetermined touch pressure threshold to a second threshold when the detected distance between the portable electronic device and the object is smaller than the predetermined distance.

12. The portable electronic device of claim 11, further comprising:

a touch pressure measuring module, configured to measure a touch pressure value corresponding to a touch on the touch panel;

a touch pressure determining module, configured to determine whether the touch pressure value is greater than the predetermined touch pressure threshold to generate a determination result; and a control module, for determining whether to perform a touch function corresponding to the touch according to the determination result.

13. The portable electronic device of claim 12, wherein the control module is configured to perform the steps of:

performing the touch function corresponding to the touch when the determination result indicates that the touch pressure value is greater than the predetermined touch pressure threshold; and skipping the step of performing the touch function corresponding to the touch when the determination result indicates that the touch pressure value is not greater than the predetermined touch pressure threshold.

14. The portable electronic device of claim 12, wherein the touch panel further comprises:

a display; and a first resistive plate and a second resistive plate, disposed on the display, wherein the touch pressure measuring module measures a contact resistance caused by the touch and formed between the first resistive plate and the second resistive plate and transforms the contact resistance into the touch pressure value.

15. The portable electronic device of claim 10, wherein:
the sensor is further configured to determine whether the detected distance between the portable electronic device and the object is smaller than a predetermined distance; and the touch pressure threshold setting module is further configured to perform the steps of:

enabling the portable electronic device to operate in a first mode and skipping the step of adjusting the predetermined touch pressure threshold when the detected distance between the portable electronic device and the object is not smaller than the predetermined distance; and enabling the portable electronic device to operate in a second mode and adjusting the predetermined touch pressure threshold to a second threshold when the detected distance between the portable electronic device and the object is smaller than the predetermined distance.

16. The portable electronic device of claim 15, further comprising:

a touch pressure measuring module, configured to measure a touch pressure value corresponding to a touch on the touch panel when the portable electronic device operates in the second mode;

a touch pressure determining module, configured to determine whether the touch pressure value is greater than the second threshold to generate a determination result; and a control module, configured to determine whether to perform a touch function corresponding to the touch according to the determination result.

17. The portable electronic device of claim 16, wherein the control module is further configured to perform the steps of:

performing the touch function corresponding to the touch when the determination result indicates that the touch pressure value is greater than the second threshold; and skipping the step of performing the touch function corresponding to the touch when the determination result indicates that the touch pressure value is not greater than the second threshold.

18. The portable electronic device of claim 16, wherein the touch panel further comprises:

a display; and a first resistive plate and a second resistive plate, disposed on the display, wherein the touch pressure measuring module measures a contact resistance caused by the touch and formed between the first resistive plate and the second resistive plate and transforms the contact resistance into the touch pressure value.

* * * * *